United States Patent [19]
Hattori et al.

[11] 3,944,812
[45] Mar. 16, 1976

[54] ELECTROOPTIC THIN-FILM MODULATOR

[75] Inventors: Shuzo Hattori; Tadao Hiramatsu, both of Nagoya, Japan

[73] Assignee: Hagiwara Denki Kabushiki Kaisha, Nagoya, Japan

[22] Filed: Mar. 8, 1974

[21] Appl. No.: 449,545

[30] Foreign Application Priority Data
Mar. 8, 1973 Japan.................. 48-27343

[52] U.S. Cl........... 250/201; 332/7.51; 350/96 WG; 350/96 C; 350/160 R; 350/162 R
[51] Int. Cl.²..... G01J 1/20; G02B 5/14; G02F 1/32
[58] Field of Search...... 350/160 R, 96 WG, 162 R; 332/7.51; 250/201

[56] References Cited
UNITED STATES PATENTS

| | | | |
|---|---|---|---|
| 3,614,198 | 10/1971 | Martin et al. | 350/160 R |
| 3,736,045 | 5/1973 | Heidrich et al. | 350/160 R |
| 3,813,142 | 5/1974 | Buhrer | 350/160 R |

OTHER PUBLICATIONS
Interdigital Electro–Optic ... Modulator; Polky et al; Appl Phys Lett; Vol. 21 No. 7; 1 Oct. 72; pp. 307–309.
Fast ... Modulator; Hammer et al; App Phys Lett; Vol. 23 No. 4, 15 Aug. 73; pp. 176–177.

*Primary Examiner*—Vincent P. McGraw
*Attorney, Agent, or Firm*—Berman, Aisenberg & Platt

[57] ABSTRACT

On a substrate is formed a crystalline electrooptic thin-film waveguide, on which are deposited interdigital electrodes extending in the y-direction and spaced apart from one to another in the z-direction. To the electrodes is applied a modulating signal voltage to form in the waveguide an electrostatic field which is spatially periodic in the z-direction having an intensity proportional to the modulating signal voltage and uniform in the y-direction. Coherent light is coupled into and out of the waveguide with prism couplers. As the light propagates through the waveguide in the y-direction, it suffers a spatially periodic phase variation in the z-direction. The emerging light is accordingly diffracted into orders. The crystalline waveguide is manufactured easily and the light propagates fully through the electrostatic field.

11 Claims, 12 Drawing Figures

ELECTROOPTIC THIN-FILM MODULATOR

BACKGROUND OF THE INVENTION

This invention relates to an electrooptic modulator and more particularly to an electrooptic modulator of a diffraction type utilizing an electrooptic thin-film waveguide.

As coherenct light is incident in the medium wherein the propagation speed of the light wave is made periodically varied spatially in the direction perpendicular to the propagating direction of the light wave, the light beam is caused to be diffracted into orders emerging in separate directions. The intensities of the respective emergent beams are responsive to the amount of the spatial speed variation which originates from the modulation signal voltage applied to the interdigital electrodes provided on the surface of the electrooptic medium. In such a diffraction phenomenon the diffraction angles of the respective emergent beams are inversely proportional to the pitch of the spatially periodic electric field, and therefore the pitch should preferably be as small as a fraction of a millimeter to obtain a practically sufficient separation of the respective orders of emergent beams. But as it is known that such a periodic electric field concentrates within a depth of $\frac{1}{2}\pi$ times the pitch, the region where the periodic electric field substantially exists consequently becomes very thin. Therefore in this type of an electrooptic modulator, the sufficient variations of the respective light beam intensities for the actually practical light modulator requires the light beam to propagate fully through the very thin portion where the electric field is concentrated.

SUMMARY OF THE INVENTION

An object of this invention is to provide a diffraction type electrooptic modulator which is so contrived that the light propagates effectively through the portion where the electrooptic effect is acting sufficiently.

Another object of this invention is to provide a diffraction type electrooptic modulator wherein the light wave propagates in a thin-film waveguide as a guided wave mode.

A further object of this invention is to provide a thin-film waveguide which is easily manufactured and is stable in operation.

According to an aspect of this invention, a waveguide includes an electrooptic crystalline material. As one example, the waveguide path itself is made of an electrooptic crystalline material, whereas as another example the waveguide path itself is made of an non-electrooptic crystalline material but a material which is contiguous to the waveguide path and thereby forms a reflection interface is made of an electrooptic crystalline material. The waveguide path portion may be made of a single crystal of an electrooptic material in the form of a thin-film formed epitaxially on a crystalline substrate, or an aggregation of fine crystals of an electrooptic material in the form of a thin-film formed by such as sputtering on a glass substrate, or a transparent thin-film which has no electrooptic property itself but formed on a substrate of an electrooptic crystal. On a surface of the thin-film are arranged interdigital electrodes parallel to and equally spaced apart from each other. The electrodes are impressed with a positive and a negative electric potential spatially alternately one after another to form a spatially periodic electric field in the thin-film waveguide. Coherent light is coupled with a prism coupler into the waveguide, propagates in the waveguide being subject to a spatially periodic phase variation and coupled out of the waveguide with a prism coupler to propagate into different directions being diffracted into orders.

BRIEF DESCRIPTION OF THE DRAWINGS

Other objects and features of the present invention will become more apparent from the description made hereinbelow with respect to preferred embodiments thereof in conjunction with the accompanying drawings in which.

DESCRIPTION OF THE PREFERRED EMBODIMENTS

Figures 1, 2, 3, 4:
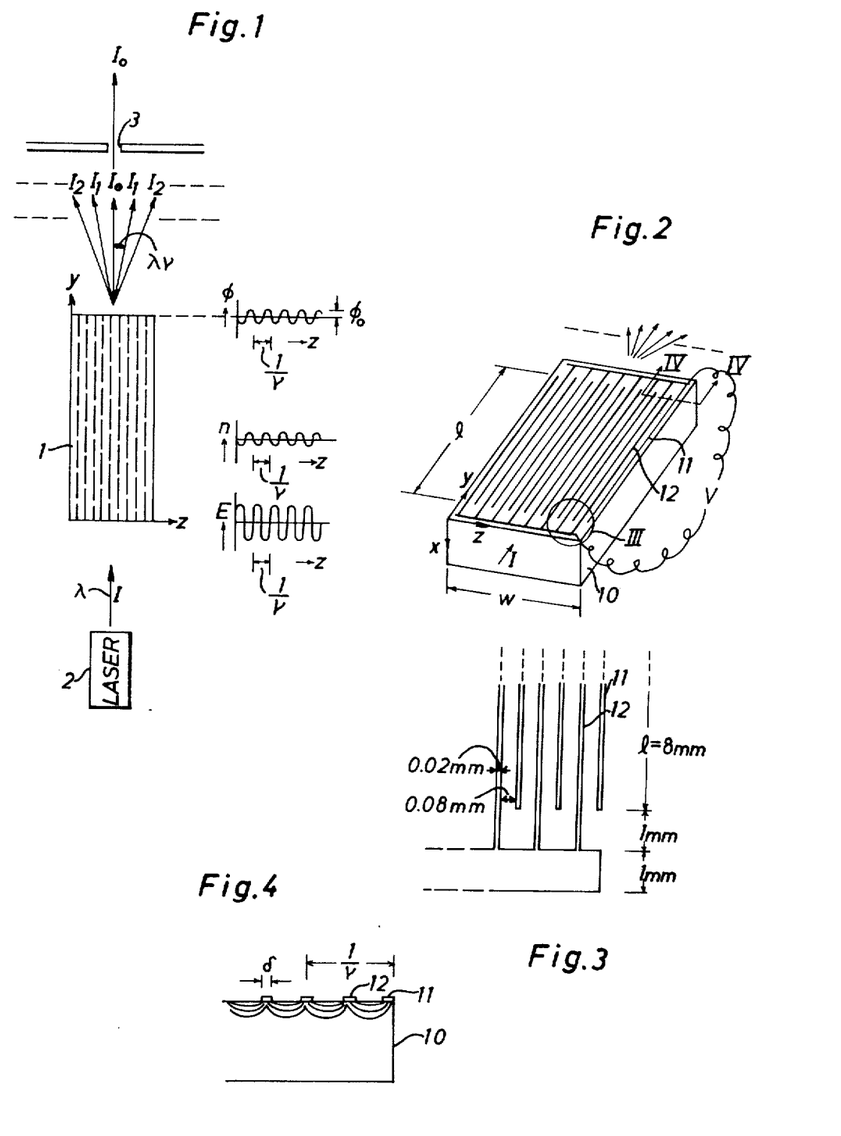
FIG. 1 is a schematic plan view illustrating fundamental functions of an electrooptic diffraction modulator.
FIG. 2 is a perspective view illustrating schematically an example of an electrooptic crystal as a modulator element according to this invention.
FIG. 3 is an enlarged plan view of the crystal at the portion as is shown in a circle III in FIG. 2.
FIG. 4 is an enlarged cross sectional view of the crystal at the portion as is shown by arrows IV — IV in FIG. 2.

Referring to FIG. 1, there are explained fundamental functions of the electrooptic diffraction modulator wherein the refractive index of the crystal is given a spatially periodic difference and consequently the phase of the emergent light has a spatially periodic difference so that the emergent light propagates in a plurality of different directions. In an electrooptic crystal 1 is produced a spatially periodic electric field E which is $$E = E_1 \sin 2\pi \nu z \tag{1}$$

spatially periodically varying in the z-direction with a variation pitch $1/\nu$. Consequently there is produced as a result of the electrooptic effect a spatially periodic variation of the refractive index, i. e. light propagation speed, with the same variation pitch $1/\nu$ in the z-direction. In case of an electrooptic crystal of 3m-symmetry with its c-axis taken as the z-axis, the deviation amount $\Delta n$ of the refractive index from the normal refractive index $n_e$ under no electric field is $$\Delta n = \frac{1}{2} n_e^3 r_{33} E_1 \sin 2\pi \nu z \tag{2}$$

A coherent light source 2 such as a laser emits a coherent light beam having a wavelength $\lambda$ and an intensity I, which beam is incident upon an electrooptic crystal 1 to propagate therein as long as a length l in the y-direction to become a plane wave having a spatially periodically varying phase $\phi$ $$\phi = \pi n_e^3 r_{33} l/\pi \, E_1 \sin 2\pi\nu z \equiv \phi_1 \sin 2\pi \nu z \quad (3)$$

which is varying in the z-direction with the same variation pitch $1/\nu$. This plane wave can be resolved into a plurality of uniform plane waves each propagating in a direction of angle $\theta_m$ (angle being taken from the undiffracted straight direction)

$$\theta_m = m\nu\lambda \quad (4)$$

and having an intensity $I_m$ $$I_m = I \cdot J_m^2(\phi_1) \quad (5)$$

where m is the diffraction order taking a value of $0, \pm 1, \pm 2, \ldots$ and $J_m$ is the m-order Bessel function of the first kind. The respective orders of the diffracted plane waves can be separately taken out by a slit 3 which is positioned sufficiently apart from the electrooptic crystal 1. In FIG. 1 the zero-order component $I_0$ is taken out. The intensity of each order output light is of a value determined by Eq. (5) in response to the amplitude value $E_1$ of the spatially periodic electric field. Where this electric field variation amplitude $E_1$ is varied in accordance with the modulating signal wave, the emergent light has an intensity (amplitude) modulated therewith.

An example of the electrode construction for producing in the crystal 10 an electric field E varying spatially periodically in the z-direction is illustrated in FIGS. 2 – 4. The electrodes are metal layers deposited on the z-y surface of the crystal 10 by, for example, photolithographically in the form of parallel strips of a width $\delta$ elongated in the y-direction and equally spaced apart from each other in the z-direction, $2\nu$ strips existing per unit length, wherein alternate strips are connected together to form the interdigital electrodes 11 and 12. Across the electrodes 11 and 12 is applied a signal voltage V. The actual dimensions of the electrodes are shown in FIG. 3 as an enlarged portion III of FIG. 2. The electric field distribution is schematically illustrated in FIG. 4 as an enlarged view at a cross section IV — IV of FIG. 2 parallel to the x-z plane. Considering that most of electrooptic crystals have sufficiently large relative permittivity (lithiumtantalate has $\epsilon_e/\epsilon_0 = 43$) and that the electric displacement current therefore concentrates within the crystal rather than out thereof, the electric field distribution is analyzed to express the z-directional component of the spatially periodic variation in the form of Fourier series, the fundamental frequency term being $$E = \frac{8}{\pi} \cdot \frac{\cos \pi \nu \delta}{1 - 2\nu\delta} \cdot V e^{-2\pi\nu \, x} \sin 2\pi\nu z \equiv E_1 \sin 2\pi\nu z \quad (6)$$

As apparent from Eq. (6), the spatially periodic electric field in the z-direction constitutes a skin field concentrated substantially within the depth of $\frac{1}{2\pi}\nu$ from the surface. Now the definition of the half-wavelength voltage in case of transverse field modulator is followed $$V_{\frac{\pi}{\pi}} = \frac{\lambda}{n_e^3 r_{33}} \quad (7)$$

there is obtained from Eq. (3) and Eq. (6)

$$\phi_1 = \frac{V}{V_{\frac{\pi}{\pi}}} 8\nu l \, \frac{\cos \pi \nu \delta}{1 - 2\nu\delta} e^{-2\pi\nu \, x} \quad (8)$$

Next is considered a case where the guided wave mode of light propagates in an electrooptic dielectric thinfilm having a thickness d and provided with the abovementioned modulation electrodes on its surface. Normalizing the electromagnetic field intensity $\phi(x)$ as $$\int_0^d \Phi^2(x) dx = 1 \quad (9)$$

Eq. (5) will be modified as $$I_m = I \cdot \int_0^d J_m^2 \left( \frac{V}{V_{\frac{\pi}{\pi}}} 8\nu l \, \frac{\cos_\pi \nu \delta}{1 - 2\nu\delta} e^{-2\pi\nu \, x} \right) \Phi^2(x) dx \quad (5a)$$

Approximately $\phi^2(x)$ has a symmetrical distribution around d/2, and most of light waveguides made of a dielectric film have a thickness $d \approx \lambda$ therefore $\nu$ can be so determined as to satisfy $$2\pi\nu \, \frac{d}{2} << 1 \quad (10)$$

Then Eq. (5a) is fairly approximated by $$I_m = I \cdot J_m^2 \left( \frac{V}{V_{\frac{\pi}{\pi}}} 8\nu l \, \frac{\cos_\pi \nu \delta}{1 - 2\nu\delta} e^{-\pi \nu \, d} \right) \quad (5b)$$

As mentioned above this invention contemplates the propagation of coherent light in the form of a guided wave mode through a thin-film. Such a thin-film waveguide is manufactured by the following methods. First, on a crystalline substrate is formed epitaxially a single crystal film having a crystalline structure similar to that of the substrate. Second, on a glassy substrate is formed by sputtering a thinfilm of a glassy or a fine crystalline structure. According to the first method, a single crystal thin-film of lithium-niobate is formed on a substrate of lithium-tantalate to make a thin-film waveguide having an electrooptic property. According to the second method, a thin-film consisting of an aggregation of fine crystals of a ferroelectric material such as lead-barium-titanate is formed on a flint glass substrate to make a thin-film waveguide. Such a thin-film made of an aggregation of fine crystals of a ferroelectric material does not have an electrooptic property as it is made, but it can be given a permanent electrooptic property by polarization of the ferroelectric fine crystals by applying a voltage between the electrodes formed on the thin-film to produce therein an electric field of about $10^6$ v/m.

Next is explained light coupling means for permitting coherent light to propagate in the thin-film waveguide as a guided wave mode. Light coupling means including prisms is explained with reference to FIG. 5. The coherent light beam emitted from a laser 2 passes through two convex lenses 20 and 21 placed with their focal points meeting each other, becomes a broadened parallel light beam and incident upon an input coupling prism 23. The prism 23 is adhered via a buffer film 15 on a thin-film waveguide 10 formed on a substrate 16. Refractive indexes of the input coupling prism 23, the buffer film 15, the thin-film waveguide 10 and the substrate 16 are $n_p$, $n_b$, $n_f$ and $n_s$, respectively, having a relation $$n_p > n_b, \; n_b < n_f, \; n_f > n_s \qquad (11)$$

Figure 5:
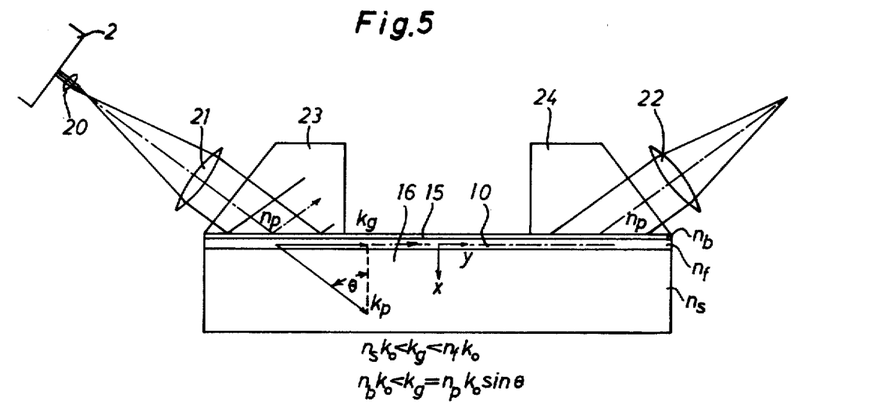
FIG. 5 is a cross sectional side view of an embodiment of this invention illustrating a manner of guided wave mode conversion.

When the incident angle $\theta$ from the input coupling prism 23 to the buffer film 15 is set as $$n_p \sin\theta > n_b \qquad (12)$$

the incident light is totally reflected toward a right-up direction as shown by an arrow in the figure. Taking the vacuum laser wave number $k_0 = 2\pi/\lambda$, and defining $P_b$ as $$(n_p k_0 \sin\theta)^2 = (n_b k_0)^2 + P_b^2 \qquad (13)$$

then there exists an entering electromagnetic field decreasing at a rate of $e^{-P_b \cdot x}$ from the interface between the prism 23 and the buffer film 15 into the buffer film 15. If $\theta$ is near to $\theta_c$ which is defined as $n_p \sin\theta_c = n_b$ and the thickness of the buffer film 15 is not very large as compared with $1/k_0 = \lambda/2\pi$, the electromagnetic field leakingly enters the thin-film waveguide 10 little by little through the buffer film 15. If the y-directional component (in the propagation direction) of the wave number vector given by $n_p k_0 \sin\theta$ is equal to the wave number vector $k_g$ in the waveguide to establish a relation $$n_p k_0 \sin\theta = k_g \qquad (14)$$

then the above-mentioned leaking electromagnetic field introduces a guided mode light beam of coincident phase throughout the incident light width in the thin-film waveguide path. The values of $k_g$ are different modes of the guided wave (i. e. TE$_0$, TE$_1$, TM$_0$, etc.) but stay within a range expressed as $$n_s k_0 < k_g < n_f k_0 \qquad (15)$$

Figure 6:
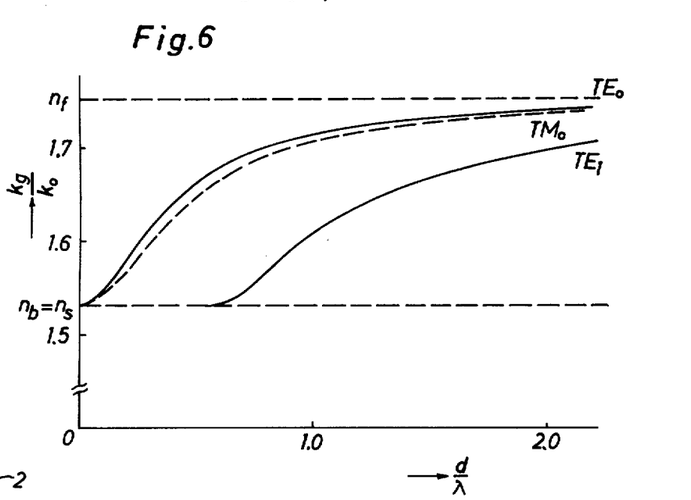
FIG. 6 is a graphic chart showing the relation between the effective refractive index and the waveguide thickness with respect to guided wave modes.

For convenience of calculation, FIG. 6 is depicted for the case where $n_b = n_s$, but it should be noted that this relation is not a necessary condition for coupling light into the thin-film waveguide. As the condition of Eq. (13) is satisfied and the relation between the thickness of the buffer film and $P_b$ is set adequate, then the totally reflected light in the coupling prism 23 will vanish away and most of the incident energy will be converted into guided mode light having a value $k_g$ as given by Eq. (14). The light which has propagated through the thin-film waveguide 10 is taken out by means of an output coupling prism 24 and passes the convex lens 22 to focus at its focal point.

Figure 7:
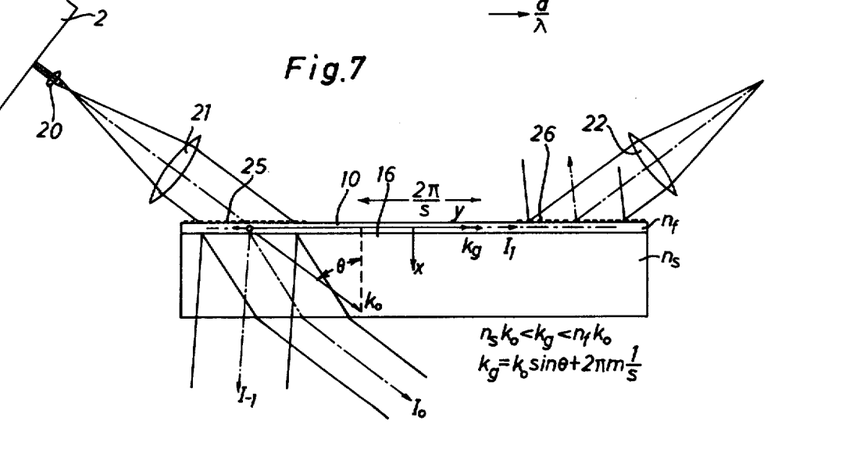
FIG. 7 is a cross sectional side view of another embodiment of this invention illustrating another manner of guided wave mode conversion.

Referring to FIG. 7, light coupling means utilizing an optical phase grating is explained. The coherent light beam emitted from a laser 2 passes through two convex lenses 20 and 21 placed with their focal points meeting each other, becomes a broadened parallel light beam and incident upon an input optical phase grating 25. Taking the grating interval of the optical phase grating 25 as $s$ and the incident angle as $\theta$, the variation rate of the light electromagnetic field in the y-direction is given as $$e^{i \left\{ k_0 \sin\theta y + \phi \sin\left(\frac{2\pi}{s} y\right) \right\}}$$

where $\phi$ represents a depth of spatial phase variation caused by the optical phase grating. Such an electromagnetic field is resolved, just as explained with reference to FIG. 1, into orders having an intensity $J_m^2(\phi)$ and varying in the y-direction as $e^{i\{k_0 \sin\theta + m(2\pi/s)\} y}$. Therefore, if the condition $$k_0 \sin\theta + m \frac{2\pi}{s} = k_g \qquad (14a)$$

is satisfied, the incident light which is imparted a spatial phase variation by means of the optical phase grating introduces a guided light wave propagating in the thin-film waveguide 10. In FIG. 7, $m = +1$ satisfies Eq. (14a). The components for $m = 0$ and $m = -1$ propagate as $I_0$ and $I_1$ in the directions shown by the arrows, respectively, to be lost.

Figure 8A:
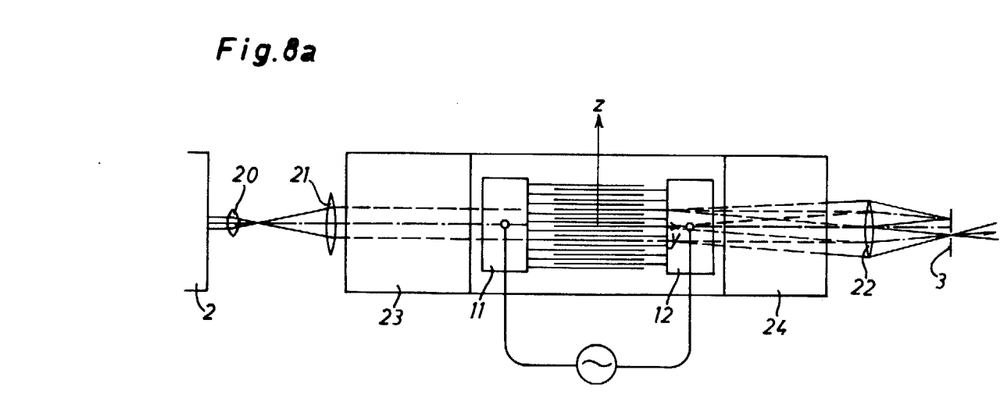
FIGS. 8a and 8b are a plan view and a side view, respectively, of an embodiment of the electrooptic diffraction modulator according to this invention illustrating the light path.
Figure 8B:
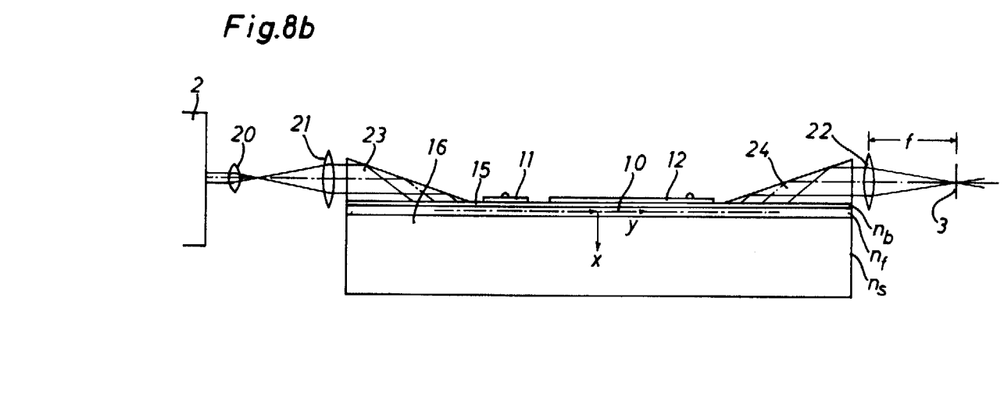

An embodiment of an electrooptic modulator according to this invention is shown in FIG. 8. Coherent light emitted from a laser 2 passes through two convex lenses 20 and 21 placed with their focal points meeting each other, becomes a broadened parallel light beam and incident upon an input coupling prism 23. Most of the incident energy passes through the buffer film 15, enters into the thin-film waveguide 10 having a thickness $d$ and exhibiting an electrooptic property and formed on the substrate 16 and propagates as a guided wave mode through the thin-film waveguide in the y-direction. The electrodes 11 and 12 cause in the electrooptic thin-film waveguide a skin electric field varying spatially periodically in the y-direction with a period of $1/\nu$. The guided wave light propagates the length 1 through the electrooptic thin-film waveguide within this skin field to become a superposition of a plurality of light beams each having an intensity given by Eq. (5b). These plurality of light beams are taken out by an output coupling prism 24 and separately focused on the focal plane of a convex lens 22 having a focal length $f$. These light beams have propagation directions respectively given by Eq. (4), where $\theta = 0$ represents the y-axis direction. Therefore these light beams focus on the focal plane of the convex lens 22 as spots aligning with an interval of $f\nu\lambda$. One of these output components is selectively taken out by means of a slit 3 located on the focal plane. In FIG. 8, the output component of $m = 1$ (first-order diffraction) is taken out.

Figure 9:
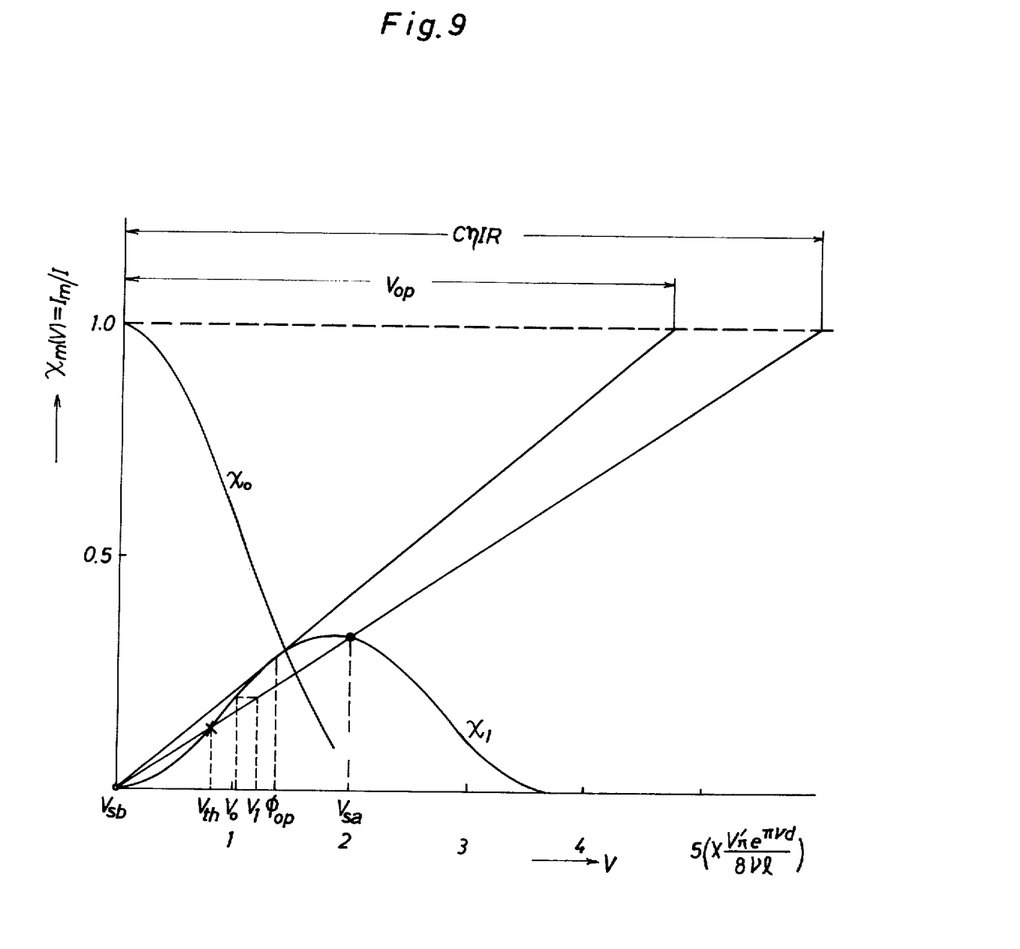
FIG. 9 is a graphic chart showing the percentage modulation and explaining the existence of stable points in the pulse modulation voltage regeneration.

Using an approximation of $\nu\delta \ll 1$, the percentage modulation $X_m$ of the output light $I_m$ as given by Eq. (5b) is expressed as $$X_m = \frac{I_m}{I} = J_m^2 \left( \frac{V}{V_\pi} 8\nu l e^{-\pi \nu a} \right) \qquad (5c)$$

and $X_m$ for $m = 0$ and $m = 1$ are graphed in FIG. 9. The abscissa indicates the voltage V between the electrodes in a unit of $V_\pi \text{'}e^{\pi\nu d}/8\nu l$. Where $\nu = 100 \text{mm}^{-1}$, $l = 20\text{mm}$, $V_\pi = 1930$ volts and $d = 0.6 \times 10^{-3} \text{mm}$, this unit is 0.128 volt. By this numerical example, $\pi \nu d \approx 0.18$ which satisfies the condition of Eq. (10) and the skin-field well exists in the waveguide film. The above-mentioned numerical example shows how efficient this light modulator is. The inter-electrode capacitance will be 120 pF, where the relative permittivity of the waveguide is 28 and the width (z-direction) of the electrode is 1 $\mu$m (so narrow that the correcting term becomes negligible).

Next is explained another example wherein the waveguide path itself is not made of an electrooptic crystal but the contiguous member is made of an electrooptic crystal. In this case, the variation of the refractive index of the material providing a reflector plane causes a variation of the phase of the guided wave so that this phenomenon is observed just like in the case of FIG. 1. The construction of this example is same as that shown in FIG. 8 except the properties of the crystals, so this example is explained with reference to FIG. 8. Just like in the preceding example, coherent light emitted from the laser 2 passes through the lenses 20 and 21, enters the prism 23, penetrating the buffer film 15 and introduced into the thin-film waveguide 10 as a mode of guided wave. The difference is that the substrate 16 is made of an electrooptic crystal and on which is deposited a transparent thin-film made of nonelectrooptic material. The electrodes 11 and 12 produce a skin electric field varying spatially periodically in the z-direction with a period of $1/\nu$ in the electrooptic crystal 16, whose refractive index $n_s$ exhibits a variation of the same spatial period. The wave number $k_g$ of the guided wave in the thin-film waveguide 10 is determined not only by the refractive index $n_f$ of the waveguide itself, but also by the refractive index $n_b$ of the buffer film 15 and the index $n_s$ of the substrate 16 both being contiguous to the waveguide 10 to form the reflecting surfaces. With respect to a $TE_0$ mode, the wave number $k_g$ of the guided wave is connected to refractive indices $n_b$, $n_f$, and $n_s$ by a relation $$(n_f^2 k_0^2 - k_g^2)^{1/2} \cdot d = \tan^{-1} \frac{(k_g^2 - n_b^2 k_0^2)^{1/2}}{(n_f^2 k_0^2 - k_g^2)^{1/2}} + \tan^{-1} \frac{(k_g^2 - n_s^2 k_0^2)^{1/2}}{(n_f^2 k_0^2 - k_g^2)^{1/2}} \quad (15a)$$

is established. Therefore, the spatially priodic variation of the refractive index $n_s$ of the electrooptic substrate 16 causes the spatially periodic variation of the wave number $k_g$ towards the same direction and with the same pitch as that of $n_s$. The variation rate of $k_g$ to the variation of $n_s$ is obtained by differentiating Eq. (15a).

where it is assumed that $(k_g^2 - n_s^2 k_0^2)^{1/2} >> 2$ so that there exists an approximately uniform electric field in the region where the guided wave propagates partially in substrate 16. After travelling the distance 1 in the thin-film waveguide 10, the phase $\phi$ of the light beam of guided wave mode represents a spatially periodic variation $$\phi = l \Delta k_g = l \frac{dk_g}{dn_s} \Delta n_s = \frac{1}{k_0} \cdot \frac{dk_g}{dn_s} \cdot \frac{\pi l E_1}{V_\pi} \sin 2\pi \nu z \quad (3a)$$

In this equation, $E_1$ should be modified as compared with Eq. (6)

$$E_1 = \frac{8}{\pi} \cdot \frac{\cos \pi \nu \delta}{1 - 2\nu \delta} \nu V f(2\pi \nu d) \quad (6a)$$

considering the change of skin-field in the thin-film waveguide. If $2\pi \nu d << 1$, then $f(2\pi \nu d) \approx 1$. The light beam having such a spatially periodically varying phase is considered to be the superposition of a plurality of orders of light beam, the m-order having an intensity $I_m$ $$I_m = I \cdot J_m^2 \left\{ \frac{V}{V_\pi} \left( \frac{1}{k_0} \cdot \frac{dk_g}{dn_s} \right) 8\nu l \frac{\cos \pi \nu \delta}{1 - 2\nu \delta} f(2\pi \nu d) \right\} \equiv I \cdot X_m \quad (5c)$$

These respective orders of output light beams are taken out by the output coupling prism 24 and separately focuses on the focal plane of the convex lens 22 having a focal length f, and the selected one is taken out by a slit 3 just like in the preceding example. As it is easy to choose the value $$\frac{1}{k_0} \cdot \frac{dk_g}{dn_s}$$

in Eq. (5c) not far less than unity as the matter of the film design, it is understood that this example is a likewise effective light modulator as the preceding example.

Figure 10:
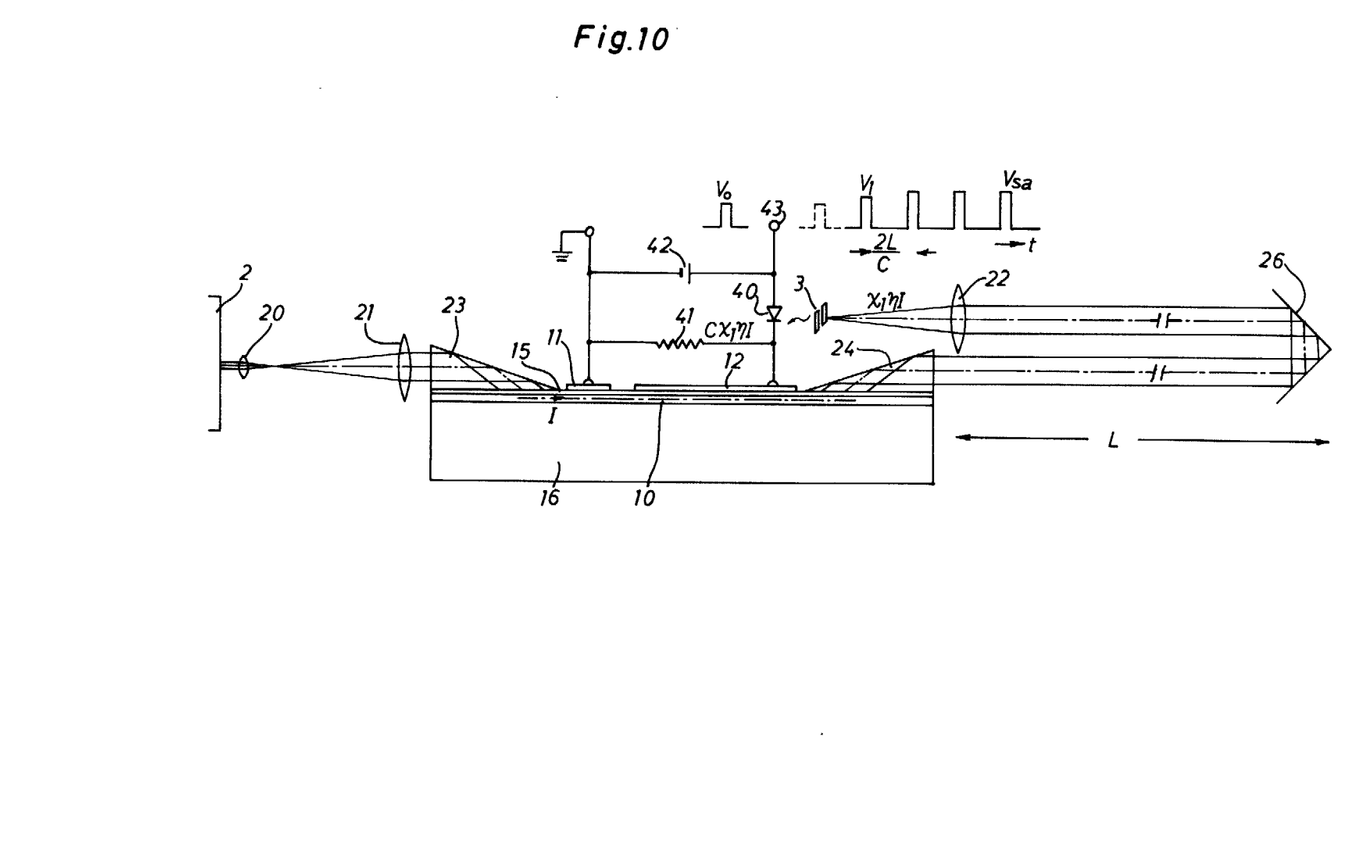
FIGS. 10 and 11 illustrate other embodiments of this invention.

Another kind of embodiment according to this invention is shown in FIG. 10. Coherent light emitted from the laser 2 is converted into a light of a guided wave mode having an intensity I by the input coupling prism 23. The guided wave mode light is modulated by a pulse signal $V_0$ applied to the electrodes 11 and 12 to become respective orders of output light respectively having intensities given by Eq. (5c) and taken out by the output coupling prism 24. The elements designated by the same reference numerals as in FIG. 8 are of the same functions. The output beams are reflected by a roof mirror 26 to pass through a convex lens 22 and focuses on the focal plane of the lens 22. The 1st-order $$\frac{1}{k_0} \cdot \frac{dk_g}{dn_s} = \frac{n_s}{n_f^2 - n_s^2} \cdot \frac{n_f^2 k_0^2 - k_g^2}{k_0 (k_g^2 - n_s^2 k_0^2)^{1/2}}$$

$$\times \frac{1}{k_g \cdot d} \cdot \frac{1}{1 + \frac{1}{(k_g^2 - n_b^2 k_0^2)^{1/2} \cdot d} + \frac{1}{(k_g^2 - n_s^2 k_0^2)^{1/2} \cdot d}} \quad (15b)$$

($m = 1$) diffracted beam passes through the slit 3 to irradiate a photo detector 40. The beam incident upon the photo detector 40 has an intensity $\eta X_1 I$, where $\eta$ designates a transmission factor through the prism 24, the mirror 26 and the lens 22. Taking the detection rate as C (ampere/watt), the photo detector 40 acts as a current source of $C\eta X_1 I$. This current flows through a resistor 41 to establish thereacross a voltage $V_1 = C\eta X_1 I R$. The photo detector 40 is applied with a bias voltage by a voltage source which provides a potential larger than the maximum value of the above-mentioned $V_1$. The detection by the detector 40 is delayed as much time as $2L/c$ from the voltage applied to the electrodes, where c stands for a light speed. In FIG. 9, $V_{op}$ is designated as a voltage at an intersection point of a horizontal line (broken one in the figure) and a tangent line from the origin $V_{sb}$ to the $X_1$-curve and given $$V_{op} = \left(\frac{V}{X_1(V)}\right)_{min} = \frac{V\pi' e \pi \nu a}{8\nu l} \cdot \frac{\phi_{op}}{J_1^2(\phi_{op})} \quad (16)$$

where $\phi_{op}$ is a value of $\phi$ which gives a relation $$\left[\frac{d\{J_1^2(\phi)/\phi\}}{d\phi}\right]_{\phi=\phi_{op}} = 0 \quad (17)$$

If $$C\eta IR > V_{op} \quad (18)$$

then a line given as $X = V/C\eta IR$ intersects with the $X_1$-curve at three points. The voltage at the middle one of the intersections indicated by an x-mark is designated as $V_{th}$. If a pulse having a voltage $V_o$ $$V_o > V_{th} \quad (19)$$

is applied to the electrodes via a terminal 43, then a voltage $V_1$ $$V_1 = X_1(V_o) C\eta IR \quad (20)$$

is caused across the detector 40. The point on X-line representing $V_1$ appears in the right of $V_o$ in the chart, which means $$V_1 > V_o \quad (21)$$

This $V_1$ in turn is applied to the electrodes to cause a second detected voltage $V_2$ $$V_2 = X_1(V_1)C\eta IR \quad (20a)$$

across the detector 40 which voltage appears in the right of $V_1$ in the chart. In this sequence greater voltages than the preceding ones are induced across the detector 40 until it reaches a voltage $V_{sa}$ to become stable at a point marked by ●. If an original pulse voltage $V_o$ is $$V_o < V_{th} \quad (19a)$$

then voltages $V_1, V_2, \ldots$ become decreased to reach a voltage $V_{sb}=0$ to become stable at a point marked by o. An optoelectronic circuit having such an operation is similar to a pulse shaping circuit or a clock pulse generating circuit in an electronic circuit technology and very useful in a pulse optoelectronics field.

Figure 11:
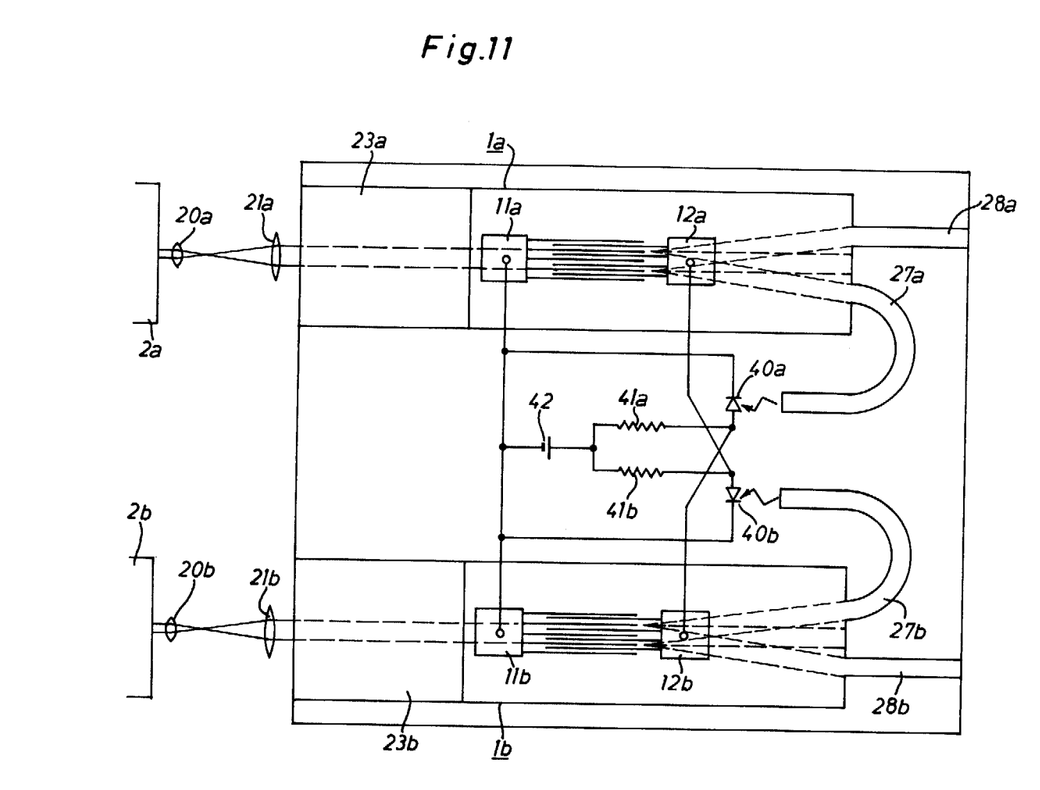

A further embodiment according to this invention is shown in FIG. 11. Coherent light beams respectively emitted from lasers 2a and 2b pass through convex lenses 20a, 21a and 20b, 21b respectively, and through input coupling prisms 23a and 23b respectively to enter modulation elements 1a and 1b respectively as light beams of a guided wave mode having an intensity I. Output coupling waveguide paths 27a and 27b have a transmission factor $\eta$, photo detector 40a and 40b have a detection rate C, resistors 41a and 41b have a resistance value R, and $C\eta IR$ satisfies Eq. (18). Across the electrodes 11a and 12a is first applied a voltage $V_{ao}$ which is greater than the voltage $V_{th}$ of an intersection of a line $X = V/C\eta IR$ and a curve $X_1(V)$ in FIG. 9. Then from the output coupling waveguide path 27a appears an output light $X_1(V_{ao})I$, which causes an electric current $CX_1(V_a)\eta I$ flowing through the photo detector 40a. If the voltage $E_o$ of a bias source 42 is set to be $$E_o = 2V_{th} \quad (22)$$

a voltage $V_{bo}$ applied to the electrodes 11b and 12b is $$V_{th} - V_{bo} = CX_1(V_{al})\eta IR - V_{th} > V_{ao} - V_{th} \quad (23)$$

With this voltage $V_{bo}$ applied to the electrodes 11b and 12b, an output light beam $X_1(V_{bo})\eta I$ appears from the output coupling waveguide path 27b to cause a current $CX_1(V_{bo})\eta I$ through the photo detector 40b. According to this current, the voltage across the electrodes 11a and 12a is corrected to $V_{al}$ $$V_{al} - V_{th} = V_{th} - CX_1(V_{bo})\eta IR > V_{th} - V_{bo} \quad (24)$$

From Eqs. (23) and (24), $$V_{al} - V_{th} > V_{ao} - V_{th}$$

and $V_{al}$ becomes greater than $V_{ao}$. Thus $V_a$ and $V_b$ become stable as they reach $V_{as}$ and $V_{bs}$ respectively which satisfy the simultaneous equations $$V_{bs} = 2V_{th} - X_1(V_{as})C\eta IR$$

$$V_{as} = 2V_{th} - X_1(V_{bs})C\eta IR \quad (25)$$

Another stable state is $V_a = V_{bs}$ and $V_b = V_{as}$. An optoelectronic circuit of such an operation as mentioned above is similar to a flip-flop in an electronic circuit field. Where $\phi_{op} = 1.359$ and $\phi_{op}/J_1^2(\phi_{op}) = 4.762$, $V_{op} = 0.688$ volt; and putting $C = 0.5$ (A·W), $I = 2(mW)$ and $\eta = 0.5$, the $R > 1380$ ($\Omega$) satisifies Eq. (18).

As mentioned with reference to embodiments, this invention provides a sensitive electrooptic modulator working at very low voltage and is manufactured easily. Moreover, this invention provides useful means for opto-electronic logical circuits design when combined with conventional Schottky barrier photo diodes.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:
1. An electrooptic modulator comprising:
   a light waveguide of an electrooptic crystalline composite structure including a substrate having a surface of a plane defined by rectangular coordinate first and second axes, a light transmissible thin-film per se having an electrooptic property and deposited on said surface of the substrate, and a buffer layer deposited on said thin-film;

a light source emitting a coherent light beam;

an input light coupler coupling said coherent light beam into said thin-film as a mode of guided wave propagating in the direction of said first axis;

interdigital electrodes engraved from a deposited metal layer on said light waveguide to cause therein an electric field which has spatial periodicity larger than the total thickness of said thin-film and buffer layers in the direction of said second axis and uniform in the direction of said first axis;

a voltage source connected to said electrodes to apply thereto a modulating signal voltage; and an output light coupler coupling the propagated light wave out of said waveguide, the coupled out light being diffracted into orders.

2. An electrooptic modulator as claimed in claim 1, wherein said substrate is of a bulk single crystal and said thin-film is of a single crystal grown epitaxially on said substrate.

3. An electrooptic modulator as claimed in claim 1, wherein said substrate is of a glass and said thin-film is of an aggregation of fine crystals formed on said substrate.

4. An electrooptic modulator as claimed in claim 1, which further comprises:

means to selectively pass one of the diffracted orders.

5. An electrooptic modulator as claimed in claim 4, which further comprises:

a photo-detector receiving an original pulsed light beam and generating a voltage responsive thereto, which voltage, once applied to said electrodes, produces a pulsed change in the output beam in said selected order which is larger than the change of said original pulsed light beam.

6. A combination of a first modulator as claimed in claim 5 and a second modulator as claimed in claim 5, which combination includes a construction wherein the photodetector in said first modulator receives the selected order of light from said second modulator and the photo-detector in said second modulator receives the selected order of light from said first modulator, to form an optical analogy of a flip-flop circuit having two stable states, either of said first and said second modulator passing through said selected order of light.

7. An electrooptic modulator as claimed in claim 2, wherein said bulk single crystal and said epitaxially grown single crystal are ferroelectric crystals of 3m crystal symmetry.

8. An electrooptic modulator comprising:

a light waveguide of an electrooptic crystalline composite structure including a substrate of an electrooptic crystal having a refractive index $n_s$ and having a surface of a plane defined by rectangular coordinate first and second axes, a light transmissible thin-film of a thickness d per se not having electrooptic property deposited on said surface of the substrate and a buffer layer deposited on said thin-film;

a light source emitting light beam;

an input light coupler coupling said coherent light beam into said thin-film as a definite mode of guided wave propagating in the direction of said first axis with a wave vector $k_g$;

interdigital electrodes engraved from a deposited metal layer on said light waveguide to cause therein an electric field which has spatial periodicity larger than the total thickness of said thin-film and said buffer layer in the direction of said second axis and uniform in the direction of said first axis;

a voltage source connected to said electrodes to apply thereto a modulating signal voltage;

an output light coupler coupling the propagated light wave of said mode out of said waveguide, the coupled out light beam being diffracted into orders; and wherein said thickness d of the thin-film is larger but not so much than the cutoff value corresponding to said mode that the derivative of said wave vector $k_g$ of said mode with regard to said refractive index $n_s$ is not much less than the wave vector in the free space.

9. An electrooptic modulator as claimed in claim 8 which further comprises:

means to selectively pass one of said diffracted orders.

10. An electrooptic modulator as claimed in claim 9, a photo-detector receiving an original pulsed light beam and generating a voltage responsive thereto, which voltage, once applied to said electrodes, produces a pulsed change in the output beam in said selected order which is larger than the change of said original pulsed light beam.

11. A combination of a first modulator as claimed in claim 10 and a second modulator as claimed in claim 10, which combination includes a construction wherein the photo-detector in said first modulator receives the selected order of light from said second modulator and the photo-detector in said second modulator receives the selected order of light from said first modulator, to form an optical analogy of a flip-flop circuit having two stable states, either of said first and said second modulator passing through said selected order of light.

* * * * *

UNITED STATES PATENT OFFICE
CERTIFICATE OF CORRECTION

Patent No. 3,944,812     Dated March 16, 1976

Inventor(s) Shuzo Hattori; Tadao Hiramatsu

It is certified that error appears in the above-identified patent and that said Letters Patent are hereby corrected as shown below:

Column 2, line 57, "$E_1 sin2_\pi \nu z$" should read --$E_1 sin2\pi\nu z$--; line 68, "$2_\pi \nu 2$" should read --$2\pi\nu z$--. Column 3, line 8, "$r_{33} 1/\pi$" should read --$r_{33}\frac{\ell}{\lambda}$--; "$2_\pi \nu z$" should read --$2\pi\nu z$--; line 67, "$\frac{8}{\pi} \frac{cos_\pi \nu \delta}{1 - 2\nu\delta} \cdot V \cdot e^{-2\pi\nu\ x} \cdot sin\ 2_\pi \nu z$" should read --$\frac{8}{\pi} \cdot \frac{cos\pi\nu\delta}{1 - 2\nu\delta} \cdot V \cdot e^{-2\pi\nu x} \cdot sin2\pi\nu z$--. Column 4, line 8, "$V_\pi^{\ '}$" should read --$V_\pi'$--; line 15, "$\frac{V}{V\ '}_\pi$" should read --$\frac{V}{V'_\pi}$--; "$cos_\pi \nu \delta$" should read --$cos\pi\nu\delta$--; "$e^{-2\pi\nu s}_\pi$" should read --$e^{-2\pi\nu x}_\pi$--; line 31, "$\frac{V}{V\ '}_\pi$" should read --$\frac{V}{V'_\pi}$--; "$cos_\pi \nu \delta$" should read --$cos\pi\nu\delta$--; "$e^{-2\pi\nu\ x}_\pi$" should read --$e^{-2\pi\nu x}$--; line 45, "$\frac{V}{V\ '}_\pi$" should read --$\frac{V}{V'_\pi}$--; "$cos_\pi \nu \delta$" should read --$cos\pi\nu\delta$--; "$e^{-\pi\nu\ d}_\pi$" should read --$e^{-\pi\nu d}$--. Column 5, line 33, "$e^{-P\delta \cdot x}$" should read --$e^{-Pb \cdot x}$--. Column 6, line 11, "$\frac{2\pi}{s}\ y$" should read --$\frac{2\pi}{s} y$--; line 19, "$y$" should read --$y$--; line 45, "$y$" should read --$z$--; line 66, "$\frac{V}{V\ '}_\pi$" should read --$\frac{V}{V'_\pi}$--; "$e^{-\pi\nu d}_\pi$" should read --$e^{-\pi\nu d}$--. Column 7, line 3, "$V\ \pi\ ' e^{\pi\nu\ d}_\pi$" should read --$V'_\pi e^{\pi\nu d}$--; line 4, "$V_\pi^{\ '}$" should read --$V_\pi'$--; line 53, "priodic" should read --periodic--; line 63, "$\frac{1}{k_o}$" should read --$\frac{1}{k_0}$--; line 65, "$\frac{1}{1 + \frac{1}{(k_g^2 - n_b^2 k_o^2)^{1/2} \cdot d} + \frac{1}{k_g^2 - n_s^2 k_o^2)^{1/2} \cdot d}}$" should read

UNITED STATES PATENT OFFICE
CERTIFICATE OF CORRECTION

Patent No. 3,944,812  Dated March 16, 1976

Inventor(s) Shuzo Hattori; Tadao Hiramatsu

It is certified that error appears in the above-identified patent and that said Letters Patent are hereby corrected as shown below:

$$-- \cdot \cfrac{1}{1 + \cfrac{1}{(k_g^2 - n_b^2 k_0^2)^{1/2} \cdot d} + \cfrac{1}{(k_g^2 - n_s^2 k_0^2)^{1/2} \cdot d}} --.$$

Column 8, line 15, "$\cos_\pi \nu \delta$" should read --$\cos \pi \nu \delta$--; "$2_\pi \nu d$" should read --$2\pi \nu d$--; line 25, "$\dfrac{V}{V_\pi'}$" should read --$\dfrac{V}{V_\pi'}$--; "$f(2_\pi \nu d)$" should read --$f(2\pi \nu d)$--. Column 9, line 21, "$V_\pi' e^{\pi \nu d}$" should read --$V_\pi' e^{\pi \nu d}$--. Column 10, line 26, "$V_{a1}$" should read --$V_\pi$--.

Signed and Sealed this

Twentieth Day of September 1977

[SEAL]

Attest:

RUTH C. MASON  
*Attesting Officer*

LUTRELLE F. PARKER  
*Acting Commissioner of Patents and Trademarks*